(12) United States Patent
Sanno et al.

(10) Patent No.: US 8,984,608 B2
(45) Date of Patent: Mar. 17, 2015

(54) IMAGE PROCESSING APPARATUS, IMAGE PROCESSING SYSTEM, AND COMPUTER-READABLE STORAGE MEDIUM FOR GENERATING A TOKEN VALUE

(71) Applicants: Yumi Sanno, Tokyo (JP); Sachiyo Terada, Tokyo (JP)

(72) Inventors: Yumi Sanno, Tokyo (JP); Sachiyo Terada, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/710,745

(22) Filed: Dec. 11, 2012

(65) Prior Publication Data

US 2013/0167214 A1 Jun. 27, 2013

(30) Foreign Application Priority Data

Dec. 27, 2011 (JP) ................. 2011-285195

(51) Int. Cl.
*H04L 29/06* (2006.01)
*H04L 9/32* (2006.01)
*G06F 17/30* (2006.01)
*H04L 29/08* (2006.01)

(52) U.S. Cl.
CPC .............. *H04L 63/08* (2013.01); *H04L 9/3271* (2013.01); *H04L 63/0807* (2013.01); *G06F 17/30899* (2013.01); *H04L 63/00* (2013.01); *H04L 67/2804* (2013.01); *H04L 67/02* (2013.01)
USPC ..................................... 726/7; 726/9; 726/26

(58) Field of Classification Search
CPC ......... H04L 63/08; H04L 63/12; H04L 63/14; H04L 9/3271; H04L 63/0807; H04L 63/00; H04L 67/02; H04L 67/2804; G06F 17/30899
USPC ..................................... 726/9, 26, 7
See application file for complete search history.

(56) References Cited

U.S. PATENT DOCUMENTS 7,428,641 B2 * 9/2008 Allen ............................. 713/182
7,992,198 B2 * 8/2011 Guarraci et al. .................. 726/9

(Continued)

FOREIGN PATENT DOCUMENTS

| JP | 2004-103008 | 4/2004 |
| JP | 2010-113566 | 5/2010 |

OTHER PUBLICATIONS

Extended Search Report issued Apr. 29, 2013 in European Patent Application No. 12197642.7.

*Primary Examiner* — Chau Le
*Assistant Examiner* — Don Zhao
(74) *Attorney, Agent, or Firm* — Oblon, McClelland, Maier & Neustadt, L.L.P.

(57) ABSTRACT

An information processing apparatus includes a first session managing unit configured to manage a transaction including a request and a response over a network and a second session managing unit configured to manage authentication identification information of an authenticated user. The information processing apparatus also includes a token generating unit configured to acquire authentication identification information of a requesting user and generate a token value to be included in a first response using an internally managed value, in response to a first request, and a token validating unit configured to acquire the authentication identification information of the requesting user in response to a second request and validate correctness of a token value included in the second request by comparing the token value with a token value calculated using the managed value.

14 Claims, 15 Drawing Sheets

(56) References Cited

U.S. PATENT DOCUMENTS

| | | | |
|---|---|---|---|
| 2003/0115480 A1* | 6/2003 | McDysan | 713/201 |
| 2004/0064469 A1 | 4/2004 | Takahashi et al. | |
| 2004/0128540 A1* | 7/2004 | Roskind | 713/201 |
| 2005/0039055 A1* | 2/2005 | Balaz et al. | 713/201 |
| 2006/0005008 A1* | 1/2006 | Kao | 713/153 |
| 2008/0115201 A1 | 5/2008 | Sturms et al. | |
| 2008/0189423 A1 | 8/2008 | Takahashi et al. | |
| 2008/0235776 A1* | 9/2008 | Nakatomi et al. | 726/7 |
| 2011/0138185 A1* | 6/2011 | Ju et al. | 713/171 |
| 2011/0258704 A1 | 10/2011 | Ichnowski | |
| 2013/0014239 A1* | 1/2013 | Pieczul et al. | 726/7 |
| 2013/0047235 A1* | 2/2013 | Pieczul et al. | 726/7 |

* cited by examiner

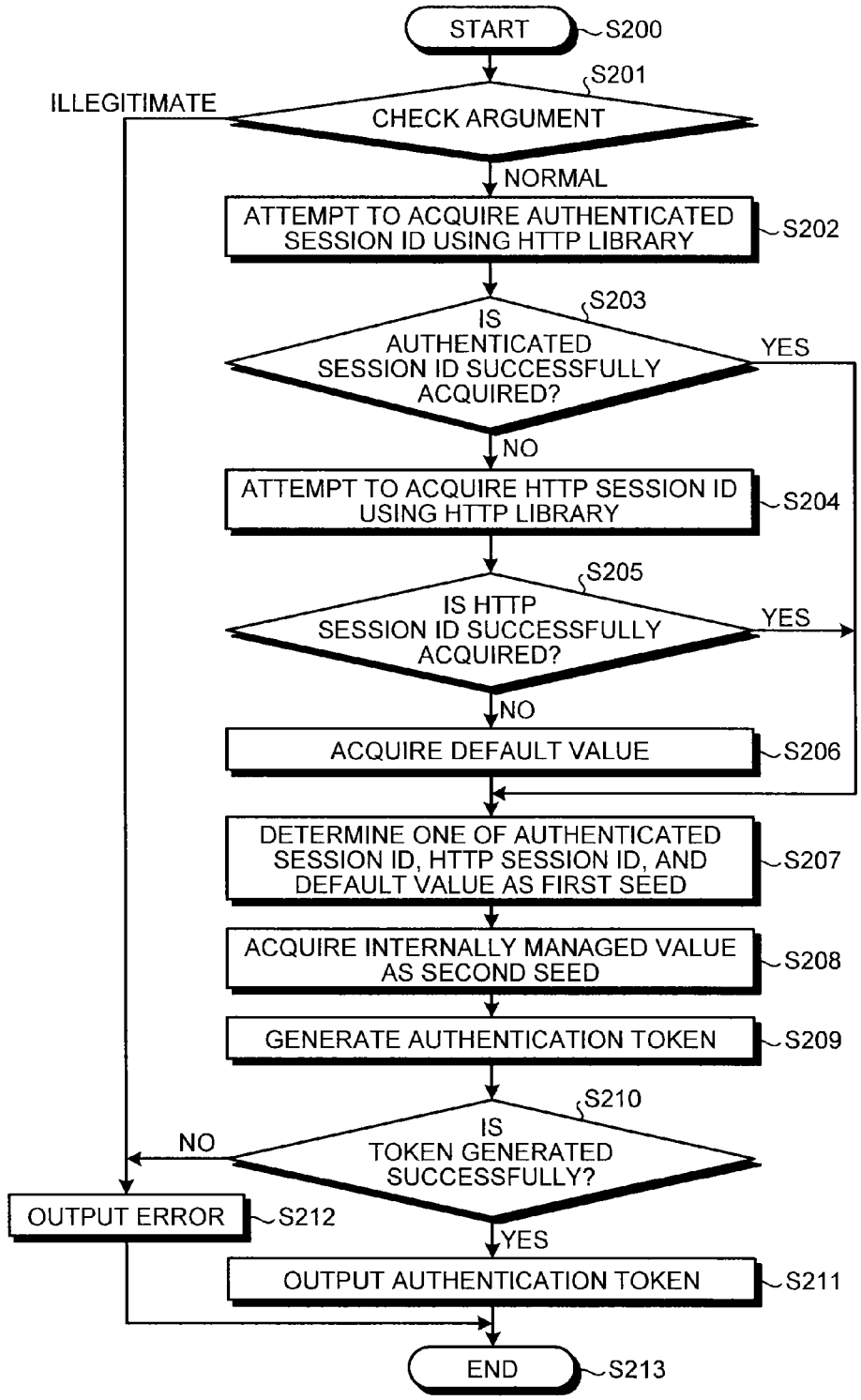

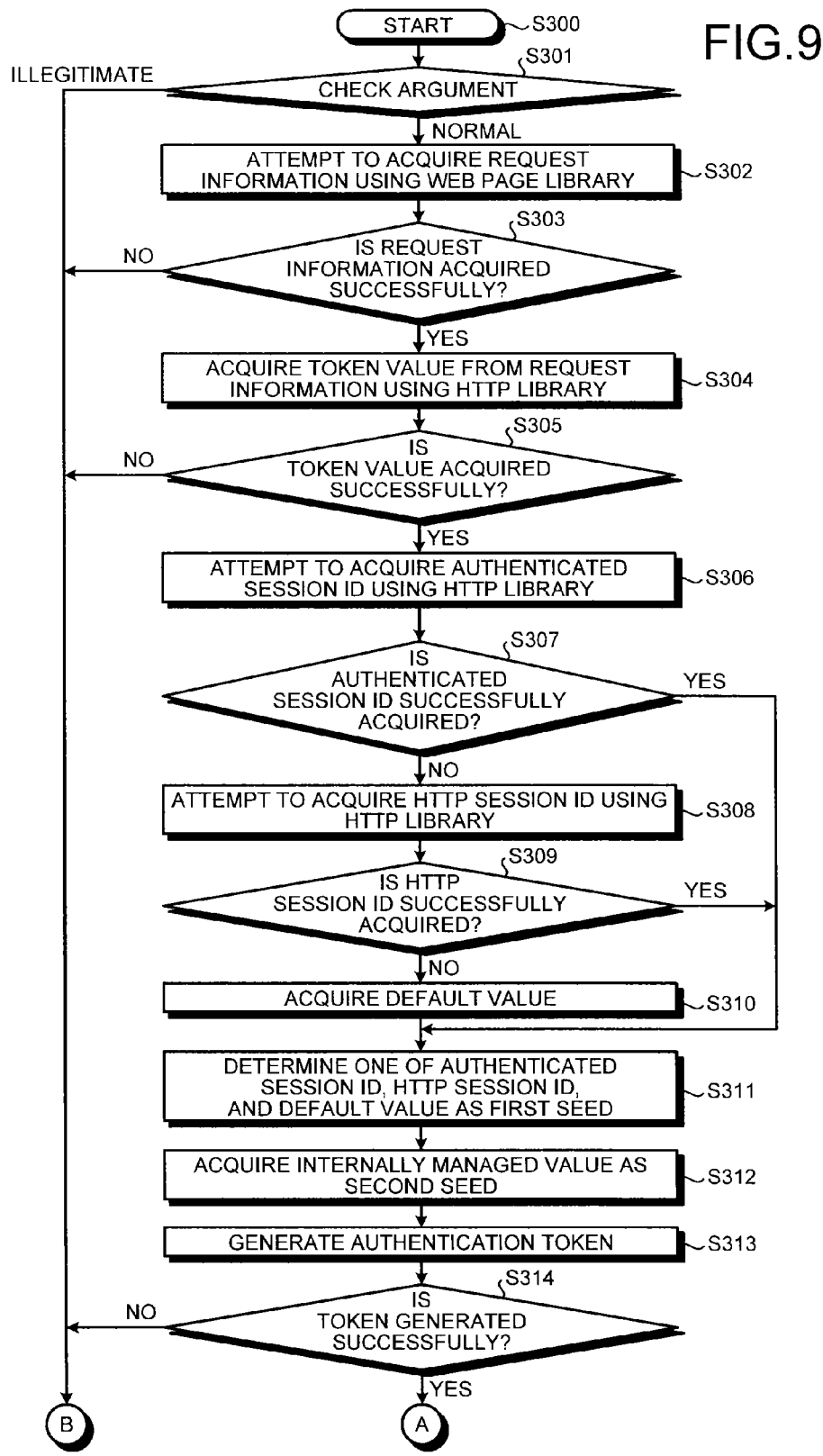

FIG.13

| AUTHENTICATED SESSION ID | TOKEN |
|---|---|
| 123456 | |
| 879012 | |
| 345678 | |
| 901234 | |
| ⋮ | |

IMAGE PROCESSING APPARATUS, IMAGE PROCESSING SYSTEM, AND COMPUTER-READABLE STORAGE MEDIUM FOR GENERATING A TOKEN VALUE

CROSS-REFERENCE TO RELATED APPLICATIONS

The present application claims priority to and incorporates by reference the entire contents of Japanese Patent Application No. 2011-285195 filed in Japan on Dec. 27, 2011.

BACKGROUND OF THE INVENTION

1. Field of the Invention

The present invention relates to a web application, and more particularly, to an information processing apparatus, an information processing system, and a computer program for realizing a web application provided with measures for vulnerabilities.

2. Description of the Related Art

Due to a recent development and popularization of networking technologies and web technologies, web technologies are used not only in Internet services such as on-line shopping but also incorporated in equipment such as multifunctional peripherals (MFPs). For example, an MFP is provided with a web interface for performing settings, so that various settings can be performed to the MFP via a web browser easily and conveniently.

At the same time, recently, there have been some concerns about vulnerabilities that are unique to web applications. Various vulnerabilities, such as structured query language (SQL) injections, cross-site scripting (XSS), and cross-site request forgeries (CSRF), are known. A CSRF is a vulnerability in which, when a web browser accesses a malicious page, a JavaScript (registered trademark) or the like is executed, and the browser is caused to post a malicious parameter on a web user interface of an MFP. At this time, because a cookie stored in the browser is used, the access is accepted as a legitimate hypertext transfer protocol (http) session.

These vulnerabilities unique to web applications are causing problems not only in Internet services such as on-line shopping but also in incorporated equipment such as MFPs. For example, in the case of an MFP, various settings in an MFP could be changed by a CSRF acting as if the request is made by a legitimate administrative user.

Known measures for the CSRF vulnerability from the viewpoint of web application designers are an approach asking a user to enter authenticating information such as a user identification (ID) and a password, and an approach exchanging a message appended with a one-time or fixed authentication token as well as a cookie, for example. In the approach using an authentication token, the server manages a character string that is difficult to assume. The character string is then set in an input form as a hidden parameter or the like, and the consistency of the parameter is checked.

Known as another conventional technology as a measure for the vulnerabilities unique to web applications is that disclosed in Japanese Patent Application Laid-open No. 2010-113566. Japanese Patent Application Laid-open No. 2010-113566 discloses a configuration that is intended to improve robustness of a web application against attacks over a network, and prevents attacks by causing a session to bypass a hook process, without modifying the source code of the web application. More specifically, in the configuration disclosed in Japanese Patent Application Laid-open No. 2010-113566, when a process request is received over a network, a process insertion control unit hooks to the requested process at predefined timing in response, and interrupts the process with a predetermined process at that timing. A privilege inspecting unit then determines, in response to a call, whether an access to a process executing unit is permitted based on first definition information defining privileges for accessing resources for each type of access and each request for the process.

As explained above, various CSRF vulnerability measures are known in conventional technologies as well. However, the approach asking a user to enter authenticating information is disadvantageous from the viewpoint of a user, because it is cumbersome for a user to enter the authenticating information again, although the user has already been authenticated in a log-in screen. In the conventional technology using an authentication token, an authentication token for validating requests needs to be generated and stored in the memory for each user. Therefore, the memory efficiency is reduced, disadvantageously. A reduced memory efficiency is an issue especially in incorporated equipment such as MFPs with limited resources, and in a web application processing a large amount of pages and to which a numerous number of users sign in. Furthermore, despite the technology disclosed in Japanese Patent Application Laid-open No. 2010-113566 provides a measure for the CSRF vulnerability, the technology is incapable of improving the memory efficiency.

The present invention is made in consideration of such issues in the conventional technologies, and an object of the present invention is to provide an information processing apparatus, an information processing system, and a computer program that can validate a request without requiring an authentication token for validating a request to be stored separately in a memory for each user, and without forcing a user to perform a cumbersome operation of entering authenticating information.

SUMMARY OF THE INVENTION

It is an object of the present invention to at least partially solve the problems in the conventional technology.

There is needed to provide an information processing apparatus, an information processing system including the information processing apparatus, and a computer program for realizing the information processing apparatus having following characteristics.

An information processing apparatus connected to a network, the information processing apparatus comprising: a first session managing unit configured to manage a transaction including a request and a response over the network; a second session managing unit configured to manage authentication identification information of an authenticated user; a token generating unit configured to acquire authentication identification information of a requesting user and generate a token value to be included in a first response using an internally managed value, in response to a first request; and a token validating unit configured to acquire the authentication identification information of the requesting user in response to a second request and validate correctness of a token value included in the second request by comparing the token value with a token value calculated using the managed value.

An information processing system comprising a server and a client connected over a network, wherein the server comprises: a first session managing unit configured to manage a transaction including a request and a response with the client over the network; a second session managing unit configured to manages authentication identification information of an authenticated user; a token generating unit configured to acquire authentication identification information of a user of the client and generate a token value to be included in a first response using an internally managed value, in response to a first request; and a token validating unit configured to acquire the authentication identification information of the user of the client in response to a second request and validates correctness of a token value included in the second request by comparing the token value with a token value calculated using the managed value, and the client comprises a browser unit configured to receive the first response from the server and transmit the second request appended with the token value included in the first response to the server.

A computer program product comprising a non-transitory computer-usable medium having a computer-executable program for causing a computer to function as an information processing apparatus connected to a network, the information processing apparatus comprising: a first session managing unit configured to manage a transaction including a request and a response over the network; a second session managing unit configured to manage authentication identification information of an authenticated user; a token generating unit configured to acquire authentication identification information of a requesting user and generate a token value to be included in a first response using an internally managed value, in response to a first request; and a token validating unit configured to acquire the authentication identification information of the requesting user in response to a second request and validate correctness of a token value included in the second request by comparing the token value with a token value calculated using the managed value.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart illustrating a token generating process performed by a token generating unit in the MFP according to the embodiment;

FIG. 9 is a first part of a flowchart illustrating a token validating process performed by a token validating unit in the MFP according to the embodiment;

FIG. 13 is a schematic for explaining how a memory efficiency is improved by the token processing according to the embodiment;

DETAILED DESCRIPTION OF THE PREFERRED EMBODIMENTS

Some embodiments of the present invention will now be explained. Embodiments of the present invention are not limited to those described below. Used as an example of an information processing apparatus according to one embodiment that is be described below is an MFP provided with a web application for allowing an external client terminal to perform various settings over a network.

Figure 1:
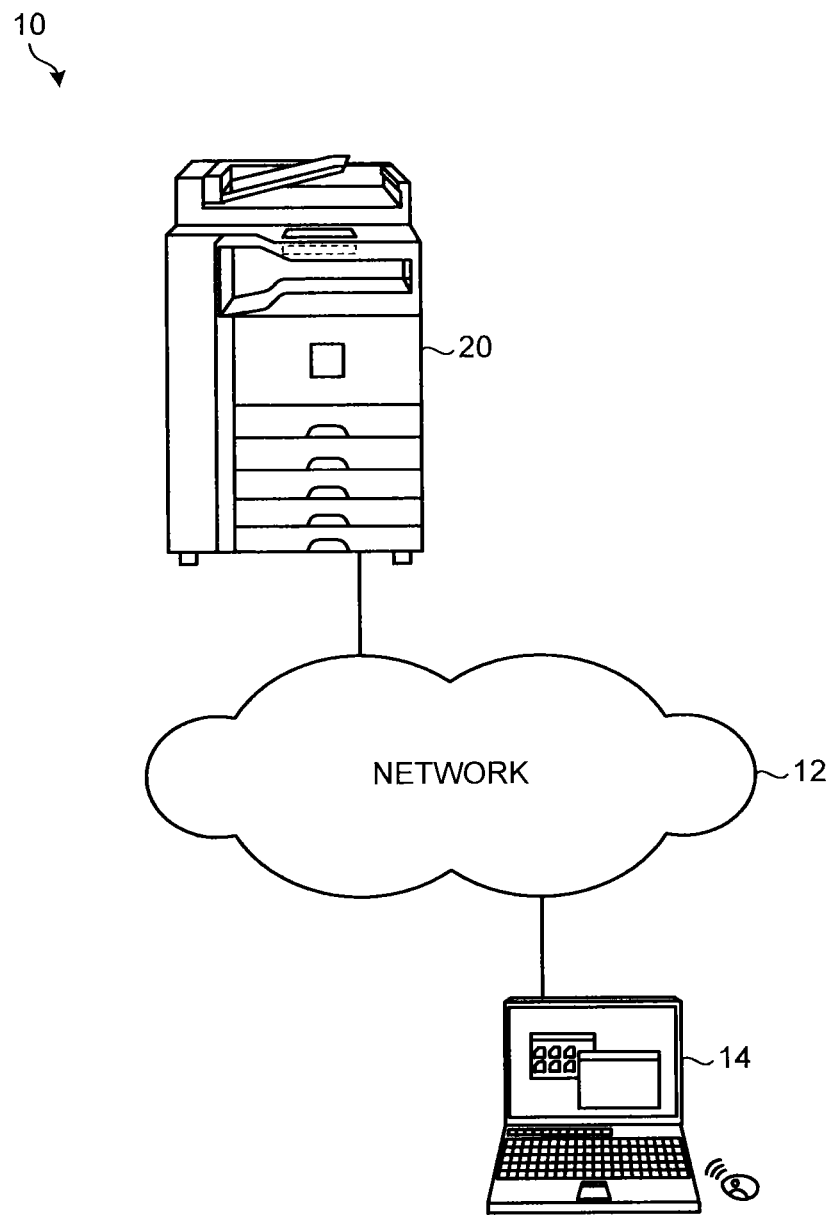
FIG. 1 is a schematic illustrating a configuration of a network environment in which an MFP according to an embodiment of the present invention is deployed.

Explained now with reference to FIG. 1 is the overall configuration of a network environment in which the MFP according to the embodiment is deployed. FIG. 1 is a schematic illustrating a configuration of a network environment in which the MFP according to the embodiment is deployed. A network environment 10 illustrated in FIG. 1 includes a network 12 such as the Internet or a local area network (LAN), and a client terminal 14 and an MFP 20 both of which are connected to the network 12.

The MFP 20 is provided with various imaging functions such as those of a copier, a scanner, a printer, and a facsimile, and provides specific imaging services to users. The MFP 20 provides the external client terminal 14 with a web user interface for performing various setting related to the imaging functions, and receives settings remotely from an administrator. Because it is preferable to accept only a setting change made by a legitimate administrative user, token processing, which will be explained later in detail, is implemented in the MFP 20 according to the embodiment, in order to protect the MFP 20 against an illegitimate request exploiting a CSRF vulnerability.

The client terminal 14 is installed with a web browser, and is a terminal operated by an administrative user of the MFP 20. An administrative user can access the web user interface provided by the MFP 20, using a web browser running on the client terminal 14, and performs various settings from various setting screens displayed on a display included in the client terminal 14. To indicate that the user is a legitimate administrative user, the client terminal 14 according to the embodiment transmits a request appended with an authentication token issued by the MFP 20.

Figure 2:
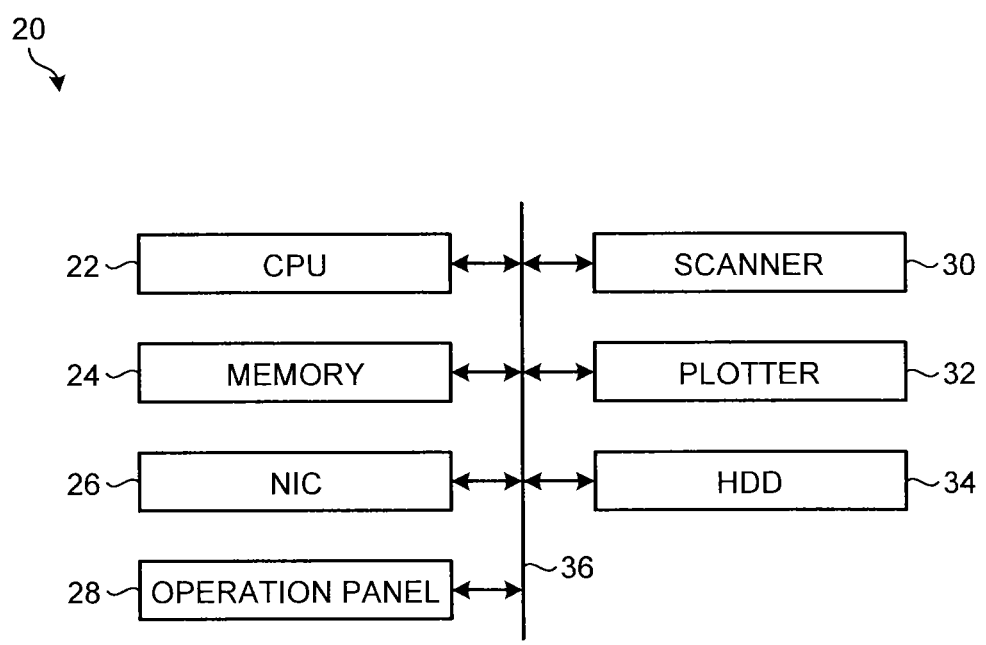
FIG. 2 is a schematic of a hardware configuration of the MFP according to the embodiment.

A hardware configuration of the MFP 20 according to the embodiment will now be explained. FIG. 2 is a schematic of a hardware configuration of the MFP according to the embodiment. As a hardware configuration, the MFP 20 illustrated in FIG. 2 includes a central processing unit (CPU) 22, a memory 24, a network interface card (NIC) 26, an operation panel 28, a scanner 30, a plotter 32, and a hard disk drive (HDD) 34.

The CPU 22 is a control unit that controls the entire MFP 20. The memory 24 provides a memory space for allowing the CPU 22 to execute a programmed process, and also used as a drawing memory, a copying image buffer, or an encoding buffer. The CPU 22 is connected to the HDD 34 via an internal bus 36. The HDD 34 executes writing and reading of data in response to an input/output request received from the CPU 22. The HDD 34 stores therein computer programs corresponding to the respective imaging functions included in the MFP 20, and also stores therein image data, document data, computer programs, font data, form data, and the like.

The CPU 22 is connected to the NIC 26 via the internal bus 36. The NIC 26 is an interface device for connecting the MFP 20 to a network such as the Internet or a LAN, and receives various commands over the network 12. The CPU 22 is also connected to the operation panel 28, including input devices such as hardware keys and a touch panel and a display device such as a liquid crystal display, via the internal bus 36. The operation panel 28 provides a user interface for receiving various instructions from an operator or for displaying a screen.

The scanner 30 reads a document set on a document table, and stores document data generated from the document in the memory 24 or the HDD 34. The plotter 32 outputs a printout of a result of image processing performed by the CPU 22 in response to a request.

Examples of the client terminal 14 include a general-purpose computer such as a personal computer or a workstation, and a mobile information terminal such as a mobile telephone, a tablet terminal, or a personal digital assistance (PDA), although a detailed explanation of the client terminal 14 is omitted herein. As a hardware configuration, the client terminal 14 includes a CPU, a memory, a HDD, a NIC, a display device, input devices such as a mouse or a keyboard, and the like.

Figure 3:
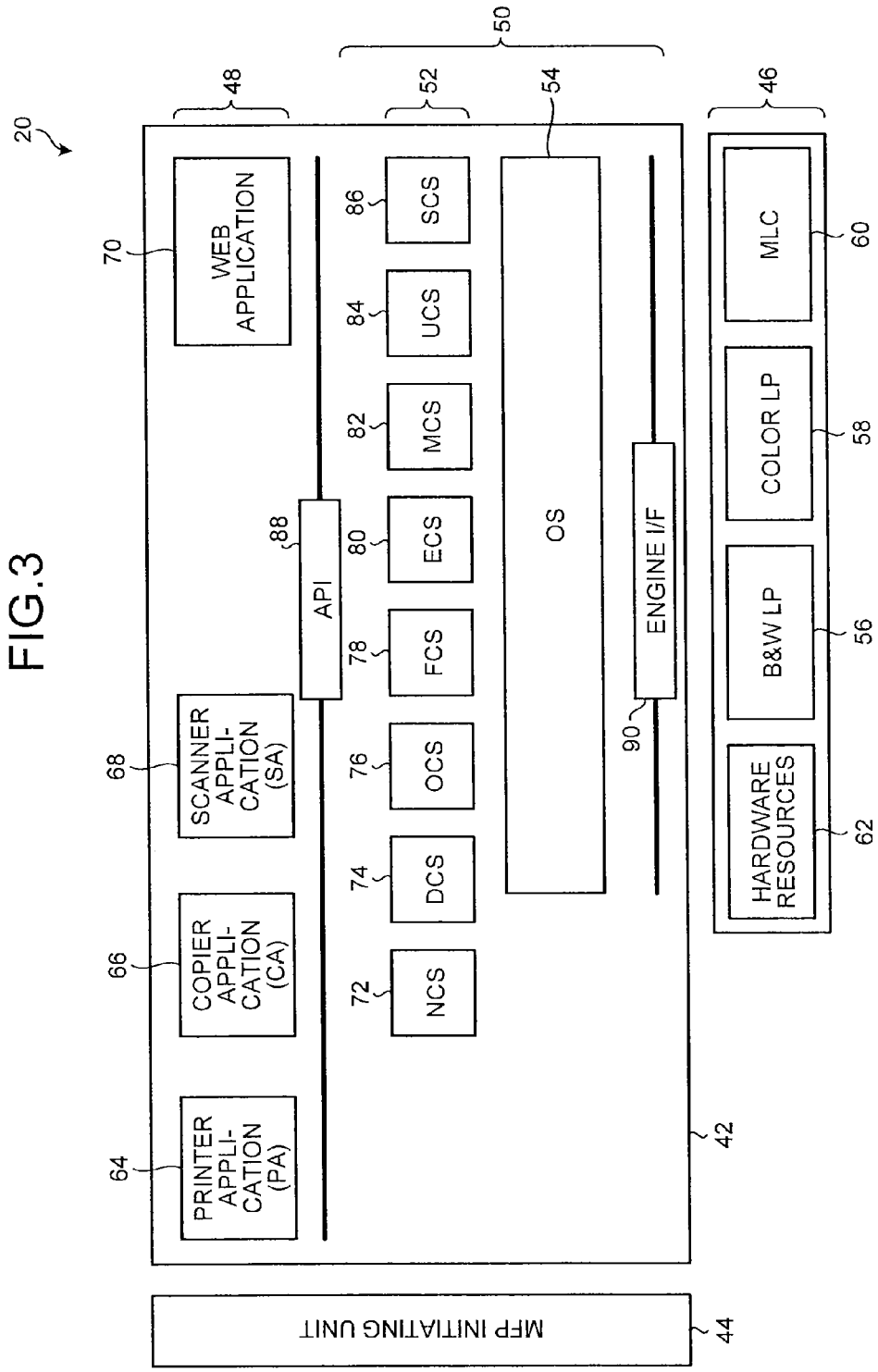
FIG. 3 is a schematic of a software configuration and a hardware configuration of the MFP according to the embodiment.

FIG. 3 is a schematic of a software configuration and a hardware configuration of the MFP 20 according to the embodiment. The MFP 20 illustrated in FIG. 3 includes a software unit 42 including various software components, an MFP initiating unit 44, and a hardware unit 46 including various hardware resources.

The hardware unit 46 includes a monochromatic laser printer (B&W LP) 56, a color laser printer (color LP) 58, a media link controller (MLC) 60, and hardware resources 62 such as a scanner and a facsimile. The software unit 42 includes an application layer 48 including various applications 64 to 70 for providing the functions of the MFP, and a platform layer 50.

The application layer 48 performs processes related to image processing specific to user services such as those of a printer, a copier, a facsimile, and a scanner. In the embodiment illustrated in FIG. 3, the application layer 48 includes a printer application (PA) 64 providing a printer function, a copier application (CA) 66 providing a copier function, a scanner application (SA) 68 providing a scanner function, and a web application 70 to be explained later in detail.

The platform layer 50 includes, as well as an operation system (OS) 54, a control service layer 52 that interprets a process request issued by the applications 64 to 70 and generates a request for acquiring hardware resources. A UNIX (registered trademark) can be used as the OS, for example, but any other OSes, such as Windows (registered trademark), are not prevented from being used. The software components in the software unit 42 are started in parallel, in units of a process running on the OS, such as a UNIX (registered trademark).

In the embodiment illustrated in FIG. 3, the control services include a network control service (NCS) 72, a delivery control service (DCS) 74, an operation panel control service (OCS) 76, a facsimile control service (FCS) 78, an engine control service (ECS) 80, a memory control service (MCS) 82, a user information control service (UCS) 84, and a system control service (SCS) 86.

The SCS 86 manages different applications, displays a system screen, makes a light emitting diode (LED) display, manages hardware resources, and controls interrupt applications. The UCS 84 manages user information. The MCS 82 acquires and releases an image memory, and performs memory control such as compressing and decompressing image data. The ECS 80 controls engines of the B&W LP 56, the color LP 58, or the scanner, or the like, and executes image scanning processes and image forming processes.

The FCS 78 is connected to a global switched telephone network (GSTN) interface, and controls facsimile transmissions and receptions over a GSTN, controls registration/citation of various facsimile data managed in a backup memory, and controls reading a facsimile. The OCS 76 controls the operation panel acting as an interface between an operator and a main apparatus control. The DCS 74 controls a delivery of a document stored in the HDD or the like. The NCS 72 controls the NIC 26, connects the MFP 20 to an Ethernet (registered trademark), and provides a service enabled to be commonly used by applications requiring a network I/O.

An application program interface (API) 88 is provided between the platform layer 50 and the application layer 48. The platform layer 50 receives a process request from the various applications 64 to 70, using a predefined function included in the API 88. An engine interface 90 is provided between the platform layer 50 and the hardware unit 46.

The MFP initiating unit 44 is started at the beginning when the MFP 20 is powered on, and reads control programs corresponding to a group of software (processes) corresponding to the platform layer 50 and the application layer 48 from a read only memory (ROM) not illustrated or from the HDD 34, for example. The MFP initiating unit 44 then loads the control programs thus read onto the memory 24 providing a memory space for executions by the CPU 22, and starts each of the processes. In this manner, the software units and each of the processes described above and to be described below are realized.

Using the software group, the MFP 20 controls the hardware resources, and provides functions of an MFP such as a copier function, a facsimile function, and a color copier function to a user, in response to a user command or an input from an external computer. The MFP 20 according to the embodiment provides an external client terminal with a web application 70 for performing various settings related to the applications 64 to 68 and to the various control services 72 to 86. The web application 70 according to the embodiment accepts a remote setting from a legitimate administrator, while protecting against an illegitimate request exploiting the CSRF vulnerability, using token processing to be described later.

The applications, the control services, and the hardware may be realized in various combinations, and may be inserted or deleted corresponding to a specific application or a specific type of the apparatus. In the embodiment illustrated in FIG. 3, a common part of the applications and the control services as an MFP is extracted and incorporated as a platform. However, the hardware configuration and the software configuration of the MFP 20 are not particularly limited.

Figure 4:
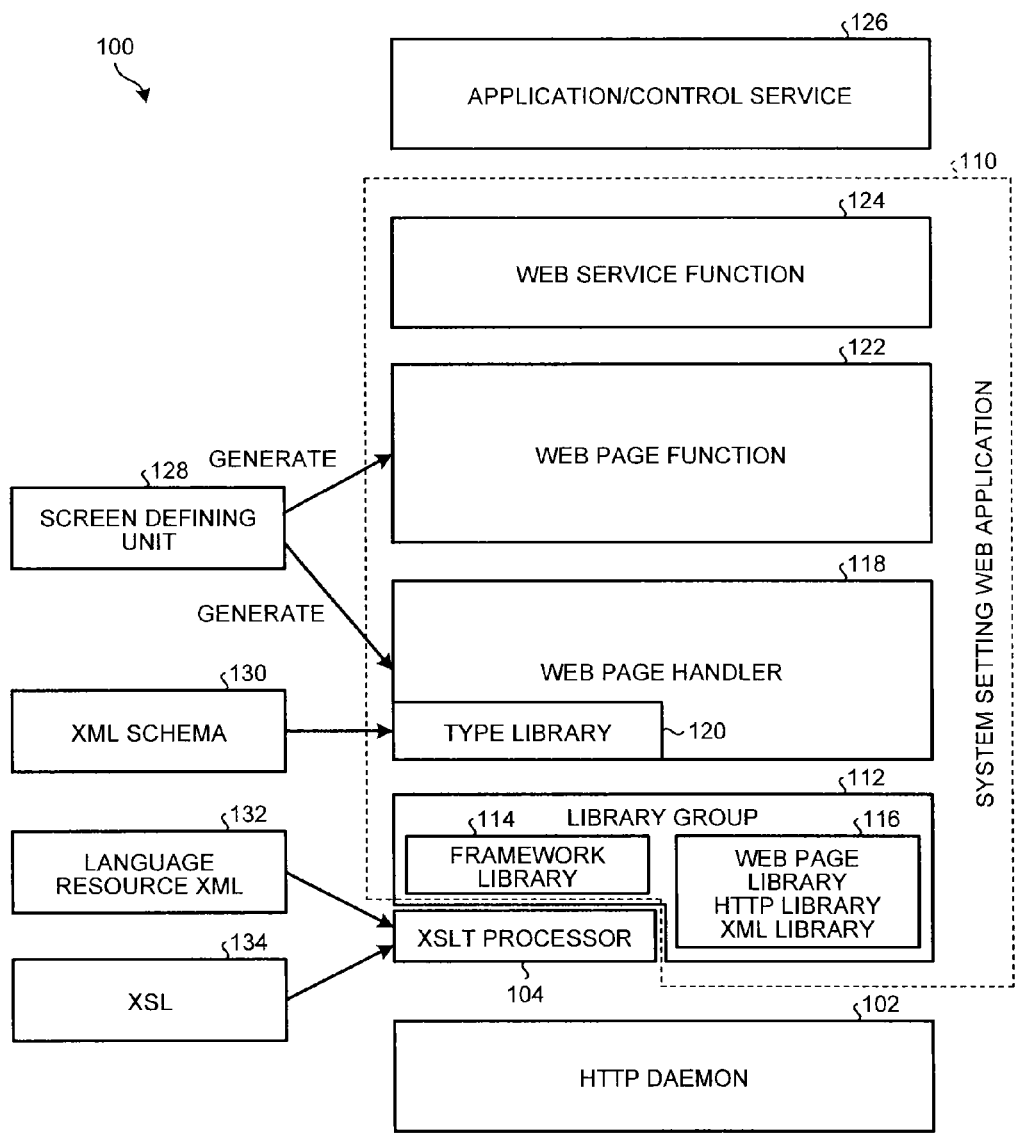
FIG. 4 is a block diagram of a system setting web application realized by the MFP according to the embodiment.

A system setting web application in which the token process according to the embodiment is implemented will now be explained with reference to FIGS. 4 to 10. FIG. 4 is a block diagram of a web server 100 related the system setting web application realized by the MFP 20 according to the embodiment. In FIG. 4, components related to the system setting web application include a hypertext transfer protocol (HTTP) daemon 102, a system setting web application 110, an application/control service 126, a screen defining unit 128, an extensible markup language (XML) schema 130, a language resource XML 132, and an XML stylesheet language (XSL) 134.

The HTTP daemon 102 is a web server program. In response to a request from the client terminal 14, the HTTP daemon 102 passes the request to the system setting web application 110 implemented on the MFP 20, and transmits a result of a process to the client terminal 14 as a response.

The system setting web application 110 includes a library group 112, a web page handler (WPH) 118, a web page function (WPF) 122, and a web service function 124 as modules.

The screen defining unit 128 in FIG. 4 retains screen definition data for defining a structure of input data and output data for each screen included in the system setting web application. In the embodiment, the screen definition data also defines if an application screen is to be protected, that is, whether the token processing is to be applied to the application screen. The WPF 122 and the WPH 118 are process functions generated based on the input and output data definition retained on the screen defining unit 128, and realize a web page of each of the screens.

The library group 112 illustrated in FIG. 4 includes various libraries 114 and 116 called by the WPF 122 and the WPH 118. The framework library 114 is provided as a framework of a web application, and provides a common process API for the web application. The token processing according to the embodiment is provided by the framework library 114.

A web page library included in a plurality of libraries 116 illustrated in FIG. 4 intermediates the web application 110 and the HTTP daemon 102. The web page library passes a request received by the HTTP daemon 102 from the client terminal 14 to the web application 110, and passes a result of a process performed by the web application 110 to the HTTP daemon 102 so that a response including the process result is returned to the client terminal 14. An HTTP library included in the libraries 116 illustrated in FIG. 4 is a library for analyzing an HTTP request, and an XML library is a library for handling the XML.

The application/control service 126 is representative of the applications 64 to 68 in the application layer 48 and the control services 72 to 86 in the control service layer 52 illustrated in FIG. 3. The web service function 124 takes out various information from the application/control service 126, and passes the information to the WPF 122. The WPF 122 executes screen-specific processes related to displaying of a web page. Using information acquired via the web service function 124 and internally managed in the MFP 20, the WPF 122 performs a data conversion required to convert the information into a web page, and passes the resultant data to the WPH 118. The WPF 122 also selects data required from a response, and passes the data to the application/control service 126 via the web service function 124.

The WPH 118 manages operations of a web page, and generates a document object model (DOM) tree of input and output data. A type library 120 is a library for handling a character type or a character string type. The DOM tree is tree-structured data before the screen is generated, and the type library 120 describes the data in the XML using the XML schema 130 from the data in the DOM tree, and an XSLT processor 104 converts the XML data into HTML data using the language resources XML 132 and XSL 134. The HTTP daemon 102 then transmits the HTML data thus converted to the client terminal 14.

Figure 5:
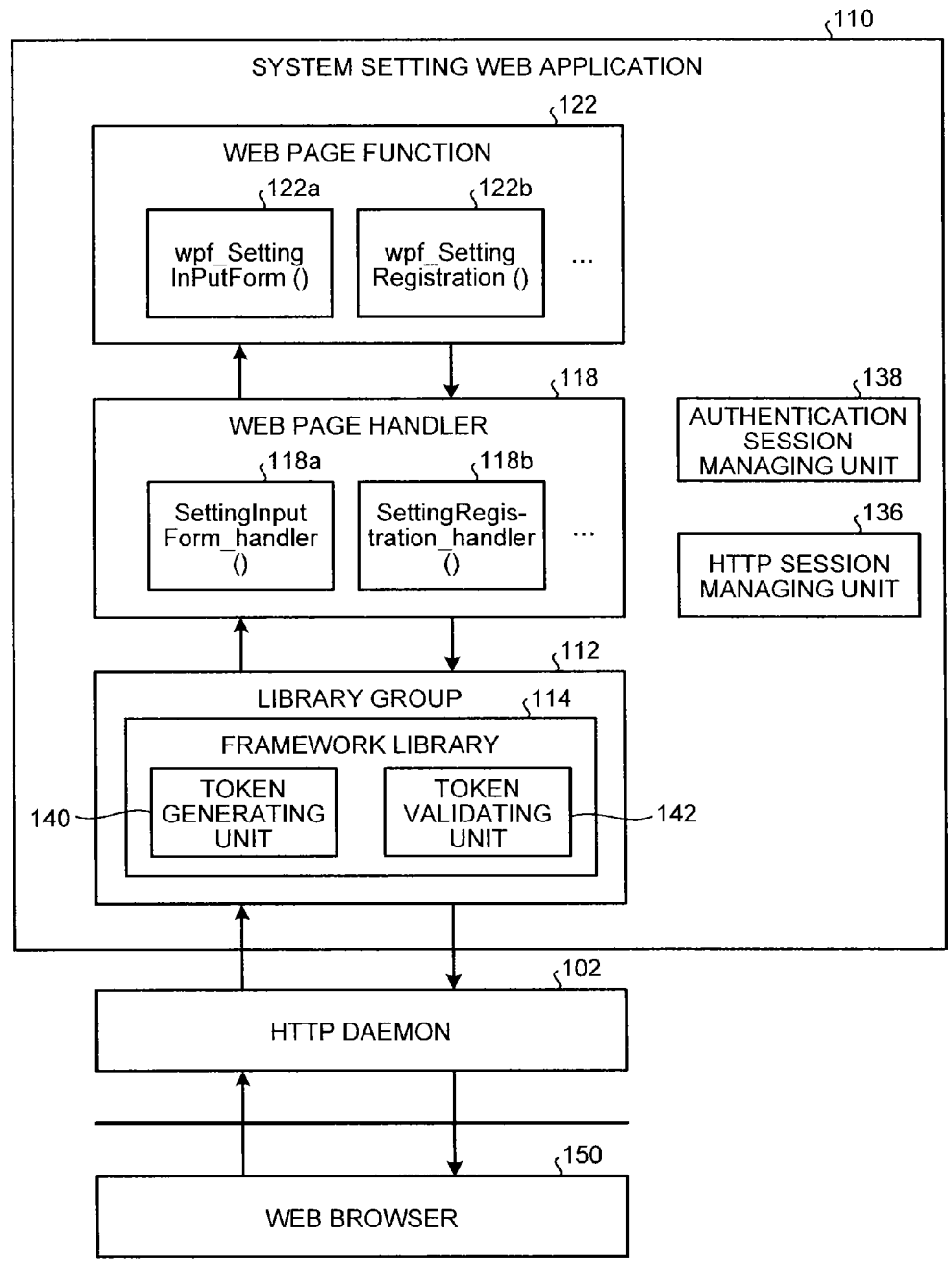
FIG. 5 is a detailed block diagram of the system setting web application realized by the MFP according to the embodiment.

FIG. 5 illustrates detailed blocks of the system setting web application realized by the MFP 20 according to the embodiment. In the system setting web application 110, a process requiring to be protected is executed via at least two steps of HTTP transactions. For example, when a particular setting is to be registered, performed between the client terminal 14 and the MFP 20 are a first transaction including a first request requesting a setting form and a first response including the setting form, and a second transaction including a second request requesting a setting to be registered via the setting form and a second response including the result of the registration process. Depending on the implementation, additional transactions may be performed. For example, performed before the registration process may be a third transaction including a third request requesting a confirmation of the setting from the setting form and a third response including a screen with the confirmation included.

FIG. 5 illustrates process functions 118a, 118b, 122a, and 122b for processing the first request requesting the setting form and the second request requesting a registration of the setting. Here, wpf_SettingInputForm( ) 122a and SettingInputForm_handler( ) 118a correspond to the first request, and makes up a setting form process function Form( ) for executing a process related to the setting form screen. Similarly, wpf_SettingRegistration( ) 122b and SettingRegistraion_handler( ) 118b correspond to the second request, and make up a registration process function Regist( ) for executing the registration process. A screen corresponding to the registration process function Regist( ) is defined to be an application screen to be protected.

The system setting web application 110 according to the embodiment manages sessions in two layers, including an HTTP session managing unit 136 and an authentication session managing unit 138. The HTTP session managing unit 136 issues and manages an HTTP session ID, to manage HTTP transactions between a web browser 150 on the client terminal 14 and the web application 110 on the MFP 20 over the network. The authentication session managing unit 138 issues and manages an authenticated session ID that is granted to a user operating on the client terminal 14 and having authenticated to log in.

An authenticated session ID is linked to a user having logged in, and retained by both of the MFP 20 and the web browser 150. An authenticated session ID is authentication identification information of an authenticated user in the embodiment. An HTTP session ID is liked to a client (user) regardless of whether the user has logged in, and retained by both of the MFP 20 and the web browser 150, in the same manner as the authenticated session ID. An HTTP session ID is information for identifying an authenticated transaction in the embodiment.

The framework library 114 included in the library group 112 includes, more specifically, a token generating unit 140 and a token validating unit 142. The token generating unit 140 has a function of generating an authentication token to be included in the first response issued in response to the first request, and provides this function to the WPH 118 using an API. The token validating unit 142 has a function of validating whether the authentication token included in the second request is correct when the second request is received, and provides this function to the WPH 118 and the WPF 122 using an API.

The token generating unit 140 and the token validating unit 142 according to the embodiment attempt to acquire an authenticated session ID of an authenticated user managed by the authentication session managing unit 138. If the token generating unit 140 or the token validating unit 142 successfully acquires the authenticated session ID, the token generating unit 140 or the token validating unit 142 calculates a token value using the authenticated session ID as a seed, and generates or validates an authentication token using the token value thus calculated. If the token generating unit 140 or the token validating unit 142 fails to acquire the authenticated session ID of the user, the token generating unit 140 or the token validating unit 142 attempts to acquire a seed for calculating a token following some steps, using available identification information.

An HTTP session ID and user agent information of the web browser 150 may be used as identification information available as a possible candidate of the seed. Examples of the user agent information include information of the browser or the OS used by the user. The user agent information is generated by the browser and transmitted to the MFP 20, unlike the authenticated session ID and the HTTP session ID.

In response to every requests received from the client terminal 14 (including the first request), the WPH 118 calls the function of the token generating unit 140 using the API included in the framework library 114, generates an authentication token, and generates a DOM tree of the authentication token. Based on the DOM tree of the authentication token, a stylesheet defined in the XSL is applied to the data. In this manner, the authentication token is embedded in the HTTP data included in the HTTP response.

When a process designated as a target of protection is requested from the WPH 118, e.g., in the case of the second request, the WPH 118 calls the function of the token validating unit 142 using the API included in the framework library 114, and validates whether the token is correct. Depending on the result of the correctness determination, the WPH 118 branches the process. The WPF 122 also calls the function of the token validating unit 142 using the API in the framework library 114 when a process designated as a target of protection is requested from the WPH 118, and determines whether the token is correct. For example, the WPF 122 is configured to determine whether the token is correct when a request addressed to the same uniform resource locator (URL) is for both of a referring process and a setting process.

Figure 6:
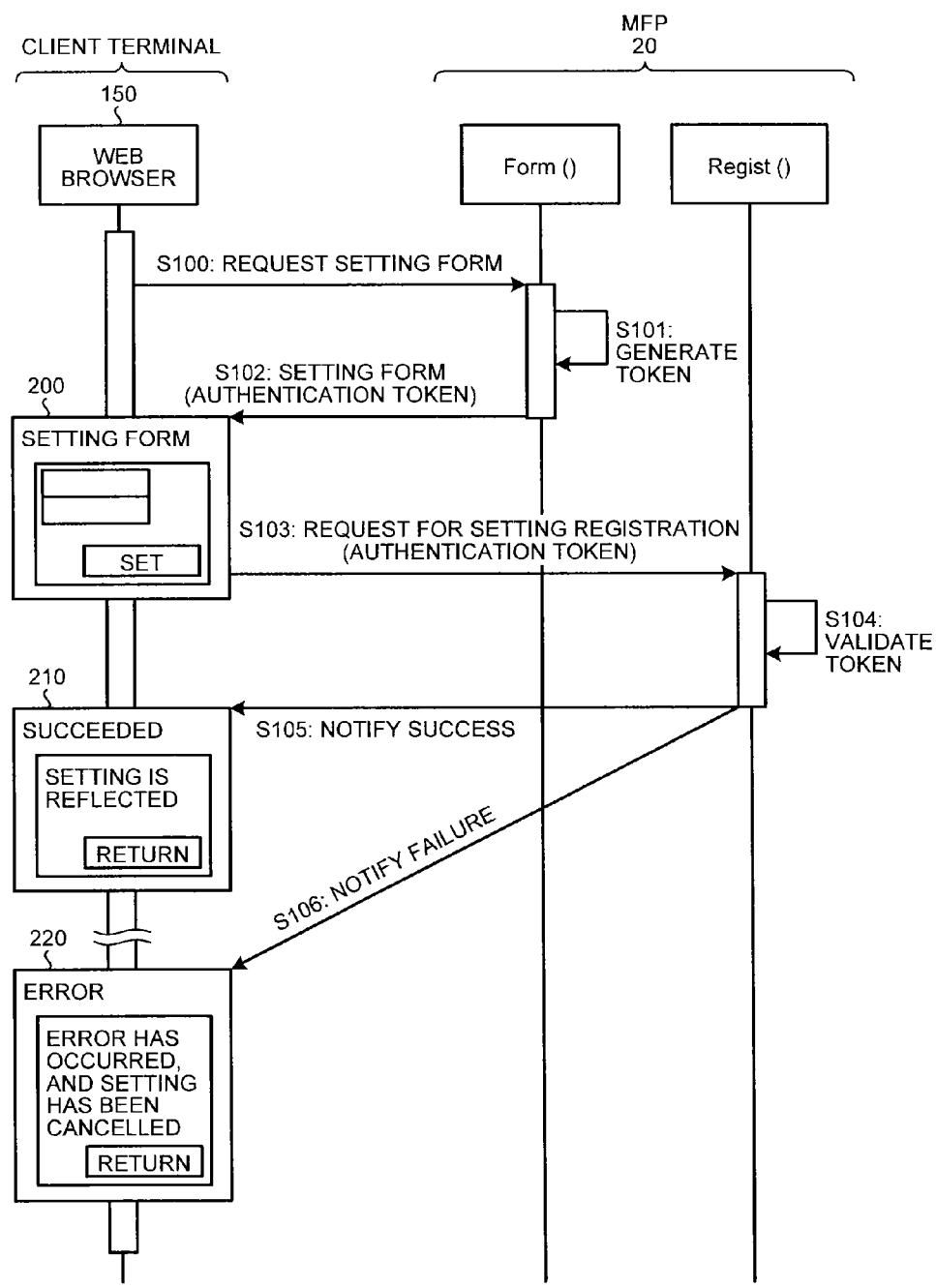
FIG. 6 is a sequence chart illustrating a setting process flow executed between a client terminal and the MFP according to the embodiment.

A setting process including the token processing executed between the client terminal 14 and the MFP 20 will now be explained with reference to FIG. 6. FIG. 6 is a sequence chart illustrating the setting process flow executed between the client terminal 14 and the MFP 20 according to the embodiment.

When an administrator specifies the URL of the setting form of the setting web application using a web browser, for example, the process illustrated in FIG. 6 is started in response. At Step S100, the web browser 150 transmits a setting form request requesting a setting form screen to the MFP 20. Upon receiving the setting form request, the MFP 20 calls the setting form process function Form( ). The setting form process function Form( ) is a process function including the wpf_SettingInputForm( ) 122*a* and the SettingInputForm_handler( ) 118*a* illustrated in FIG. 5.

At Step S101, the setting form process function Form( ) executes the token generating process using the API in the framework library 114. At Step S102, the setting form process function Form( ) embeds the token value thus generated into the setting form, and transmits HTML data of the setting form including the authentication token to the web browser 150 as a response. The HTML data of the setting form includes a code instructing the web browser 150 on the client terminal 14 receiving the response to include the authentication token embedded in the setting form before transmitting a setting registration request. The web browser 150 creates a setting form screen 200 from the HTML included in the response thus received, and displays the setting form screen 200 on the display.

Figure 7A:
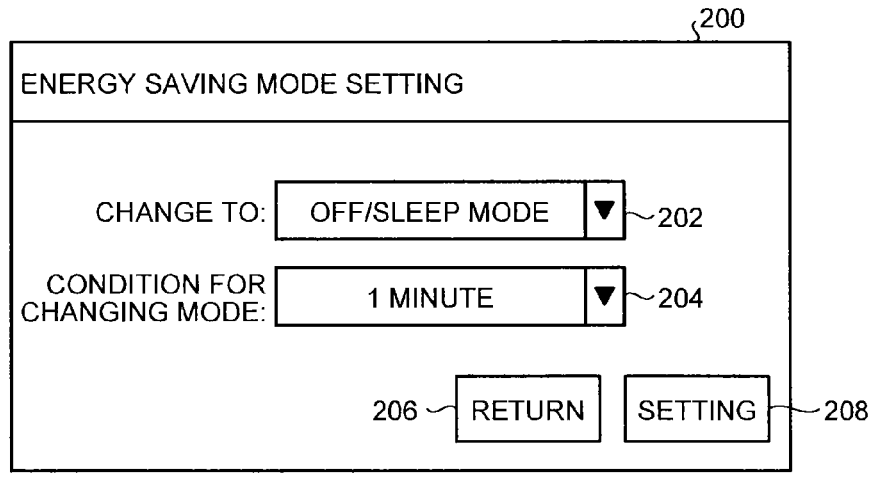
FIGS. 7A to 7C are schematics illustrating examples of various screens displayed in a web browser on the client terminal.

FIG. 7A is a schematic illustrating an example of the setting form screen 200 displayed in the web browser 150 on the client terminal 14. As illustrated in FIG. 7A, the setting form screen 200 includes pull-down menus 202 and 204 for selecting setting items, a RETURN button 206 for cancelling a setting, and a SET button 208. The SET button 208 is associated with a code instructing to transmit a setting registration request with the embedded authentication token included, and to transmit a setting registration request in response to a click event on the SET button 208.

Referring back to FIG. 6, in response to the administrator entering a setting in the setting form screen 200 and clicking on the SET button 208, the web browser 150 transmits the setting registration request including the authentication token to the MFP 20 following the code at Step S103. Upon receiving the setting registration request, the MFP 20 calls the registration process function Regist( ). The registration process function Regist( ) is a process function including the wpf_SettingRegistration( ) 122*b* and the SettingRegistration_handler( ) 118*b* illustrated in FIG. 5.

At Step S104, the registration process function Regist( ) executes an authentication token validating process using the API in the framework library 114. When a reply indicating that the authentication token included in the request is correct is received from the framework library 114, the registration process function Regist( ) executes the process of reflecting the setting thus received. At Step S105, the registration process function Regist( ) transmits HTML data of a successful setting screen indicating that the setting is successfully reflected to the web browser 150 as a response. The web browser 150 receives the response, and generates a successful setting screen 210 from the HTML data included in the response thus received.

Figure 7B:
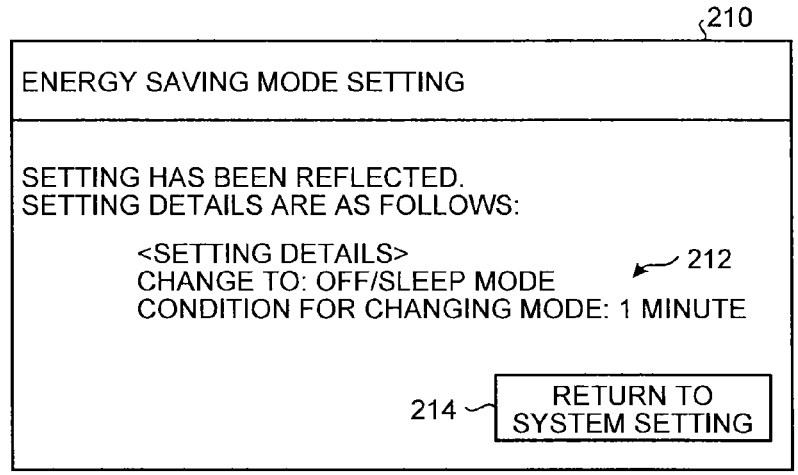

FIG. 7B is a schematic illustrating an example of the successful setting screen 210 displayed in the web browser 150 on the client terminal 14. As illustrated in FIG. 7B, the successful setting screen 210 includes setting details 212 and a RETURN button 214 for returning to a page prior to the setting form. A link to the top page of the system setting, for example, is embedded in the RETURN button 214.

Referring back to FIG. 6, if the registration process function Regist( ) receives a reply indicating that the authentication token included in the request is illegitimate from the framework library 114, the registration process function Regist( ) cancels the process of reflecting the setting thus received. In such a case, at Step S106, the registration process function Regist( ) transmits HTML data of a failed setting screen indicating that the setting failed to be reflected to the web browser 150 as a response. The web browser 150 generates a failed setting screen 220 from the HTML data included in the response thus received, and displays the failed setting screen 220.

Figure 7C:
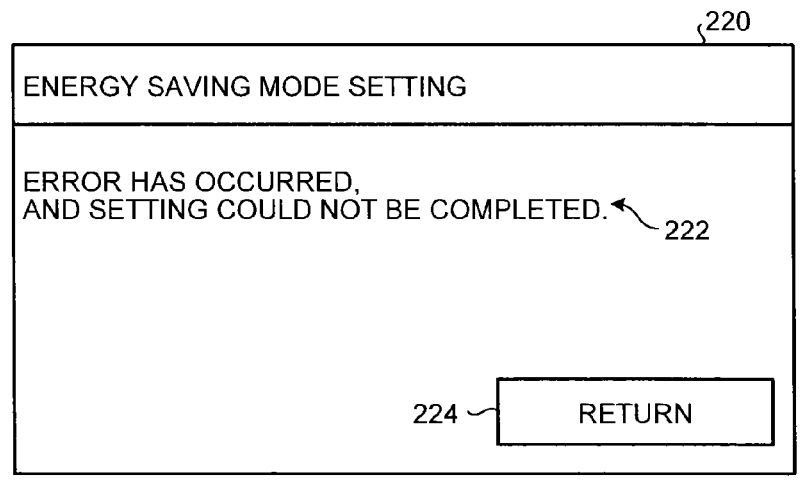

FIG. 7C is a schematic illustrating an example of the failed setting screen 220 displayed in the web browser 150 on the client terminal 14. As illustrated in FIG. 7C, the failed setting screen 220 includes setting failure details 222 and a RETURN button 224 for returning to a screen prior to the setting form.

The token processing executed by the MFP 20 will now be explained with reference to FIGS. 8, 9, and 10. FIG. 8 is a flowchart illustrating the token generating process performed by the token generating unit 140 included in the framework library 114 in the MFP 20 according to the embodiment. When the WPH 118 calls the token generating unit 140 via the API, the process illustrated in FIG. 8 is started from Step S200 in response.

At Step S201, the token generating unit 140 checks the argument received from the WPH 118. At Step S201, if the token generating unit 140 determines that the argument is correct (normal), the process goes to Step S202. At Step S202, the token generating unit 140 attempts to acquire an authenticated session ID using the HTTP library in the libraries 116. At Step S203, the token generating unit 140 determines if the authenticated session ID is acquired successfully. The authenticated session ID is successfully acquired when a user has logged in on the system setting web application 110 normally and is still logged in, but acquisition fails when a user is not logged in any longer.

At Step S203, if the token generating unit 140 determines that the authenticated session ID is successfully acquired, the process goes directly to Step S207. By contrast, at Step S203, if the token generating unit 140 determines that acquisition of the authenticated session ID fails (No), the process is branched to Step S204. At Step S204, the token generating unit 140 attempts to acquire an HTTP session ID using the HTTP library in the libraries 116. At Step S205, the token generating unit 140 determines if the HTTP session ID is successfully acquired. An HTTP session ID can be acquired at any time before the HTTP session ID expires, regardless of whether the user is still logged in. The acquisition fails when the MFP 20 is accessed for the first time, or the HTTP session ID has expired.

At Step S205, if the token generating unit 140 determines that the HTTP session ID is successfully acquired (Yes), the process goes directly to Step S207. By contrast, at Step S205, if the acquisition of the HTTP session ID, as well as of the authenticated session ID, fails (No), the process is branched to Step S206. At Step S206, the token generating unit 140 acquires user agent information of the web browser 150, and sets a character string including characters of a predetermined number (e.g., two) immediately after "/" in User-Agent as a default value, and the process goes to Step S207.

At Step S207, the token generating unit 140 determines the authenticated session ID, the HTTP session ID, or the default value acquired in the previous step as a first seed for a token calculation. At Step S208, the token generating unit 140 acquires an internally managed value that is usually managed inside of the MFP 20 and not referred externally as a second seed for the token calculation. The internally managed value is not particularly limited, and a process ID of a computer program running on the MFP 20 may be used, for example. The internally managed value is not particularly limited, and a value remaining constant while the system setting web application 110 is running is preferably used.

At Step S209, the token generating unit 140 calculates an authentication token value using the first seed and the second seed acquired in the manner described above. To calculate the token value, a multiplication of the first seed and the second seed may be used simply and conveniently. The calculation of the token value is not limited in particular, and a token value may be calculated using an appropriate hash function. In such a case, the first seed and the second seed are input to the hash function, and an output value thus calculated may be used as an authentication token.

At Step S210, the token generating unit 140 determines if the authentication token is generated successfully. At Step S210, if the token generating unit 140 determines that the authentication token is generated successfully (Yes), the token generating unit 140 outputs the authentication token to the WPH 118 or the WPF 122 being the requestor at Step S211, and the process is ended at Step S213. By contrast, if the token generating unit 140 determines that the argument is illegitimate at Step S201 (ILLEGITIMATE), or generation of the authentication token fails at Step S210 (No), the token generating unit 140 outputs an error to the WPH 118 being the requestor at Step S212, and the process is ended at Step S213.

Figure 10:
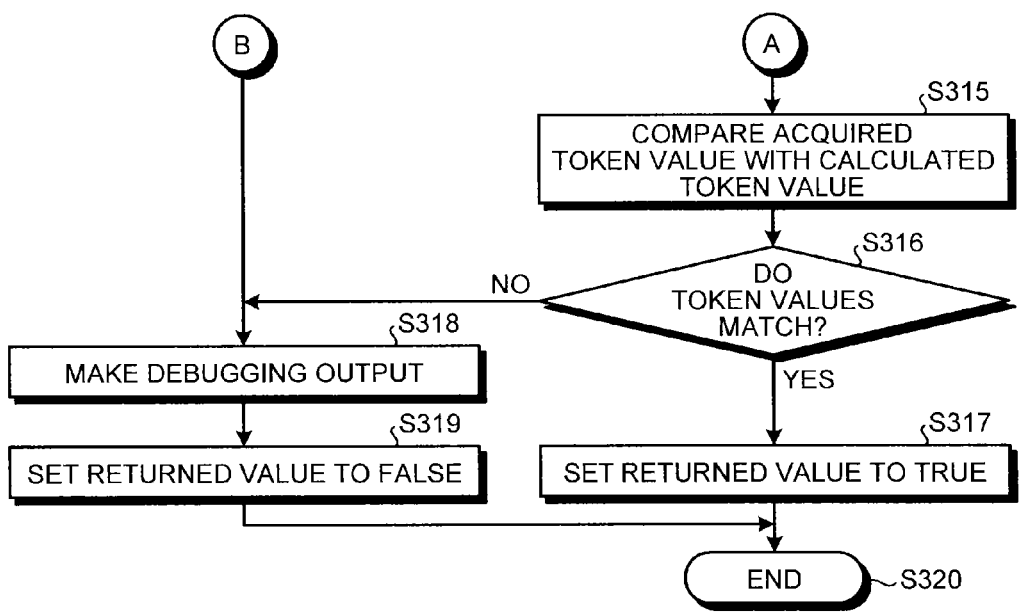
FIG. 10 is a second part of a flowchart illustrating a token validating process performed by the token validating unit in the MFP according to the embodiment.

FIGS. 9 and 10 are a flowchart illustrating the token validating process performed by the token validating unit 142 included in the framework library 114 in the MFP 20 according to the embodiment. It should be noted that FIGS. 9 and 10 are connected via a point A and a point B. When the WPH 118 or the WPF 122 calls the token validating unit 142 via the API, the process illustrated in FIGS. 9 and 10 is started from Step S300 in response.

At Step S301, the token validating unit 142 checks the argument received from the WPH 118 or the WPF 122. At Step S301, if the token validating unit 142 determines that the argument is correct (NORMAL), the process goes to Step S302. At Step S302, the token validating unit 142 attempts to acquire request information included in the HTTP request using the web page library included in the libraries 116. At Step S303, the token validating unit 142 determines if the request information is successfully acquired. At Step S303, if the token validating unit 142 determines that the request information is successfully acquired (Yes), the process goes to Step S304.

At Step S304, the token validating unit 142 attempts to acquire the authentication token embedded in the HTTP request from the request information, using the HTTP library in the libraries 116. At Step S305, the token validating unit 142 determines if the embedded authentication token is successfully acquired. At Step S305, if the token validating unit 142 determines that the embedded authentication token is successfully acquired (Yes), the process goes to Step S306.

At Step S306, the token validating unit 142 attempts to acquire the authenticated session ID using the HTTP library in the libraries 116. At Step S307, the token validating unit 142 determines if the authenticated session ID is successfully acquired. At Step S307, if the token validating unit 142 determines that the authenticated session ID is successfully acquired (Yes), the process goes directly to Step S311. By contrast, at Step S307, if the token validating unit 142 determines that acquisition of the authenticated session ID fails (No), the process is branched to Step S308.

At Step S308, the token validating unit 142 attempts to acquire the HTTP session ID using the HTTP library in the libraries 116. At Step S309, the token validating unit 142 determines if the HTTP session ID is successfully acquired. At Step S309, if the token validating unit 142 determines that the HTTP session ID is successfully acquired (Yes), the process goes directly to Step S311. By contrast, at Step S309, if the token validating unit 142 determines that acquisition of the HTTP session ID fails as well (No), the process is branched to Step S310. At Step S310, the token validating unit 142 acquires the default value from the user agent information in the web browser 150, and the process goes to Step S311.

At Step S311, the token validating unit 142 determines the authenticated session ID, the HTTP session ID, or the default value thus acquired as a first seed. At Step S312, the token validating unit 142 acquires the internally managed value as a second seed. At Step S313, the token validating unit 142 calculates a validating token value using the same function as that used by the token generating unit 140, using the first seed and the second seed thus acquired.

At Step S314, the token validating unit 142 determines if the validating token is successfully generated. At Step S314, if the token validating unit 142 determines that the validating token is successfully generated (Yes), the process goes to Step S315 illustrated in FIG. 10 via the point A. At Step S315, the token validating unit 142 compares the embedded authentication token acquired at Step S304 with the validating token value calculated at Step S313. At Step S316, the token validating unit 142 determines if the embedded authentication token matches the validating token value thus calculated. At Step S316, if the token validating unit 142 determines that the tokens match (Yes), the process goes to Step S317. At Step S317, the token validating unit 142 sets a returned value to "TRUE", the process is ended at Step S320. The returned value "TRUE" represent that the authentication token included in the request is correct.

By contrast, if the token validating unit 142 determines that the tokens do not match at Step S316 (No), the process is branched to Step S318. At Step S318, the token validating unit 142 makes a debugging output, sets the returned value to "FALSE" at Step S319, and the process is ended at Step S320. The returned value "FALSE" represents that the authentication token included in the request is incorrect.

If the token validating unit 142 determines that the argument is illegitimate at Step S301 (ILLEGITIMATE), if acquisition of the request information fails at Step S303 (No), if acquisition of the authentication token fails at Step S305 (No), or if the re-calculation of the validating token fails at Step S314 (No), the process is branched to Step S318 as well, via the point B. At Step S318, the token validating unit 142 makes a debugging output, and sets the returned value to "FALSE" at Step S319, and the process is ended at Step S320.

Figure 11:
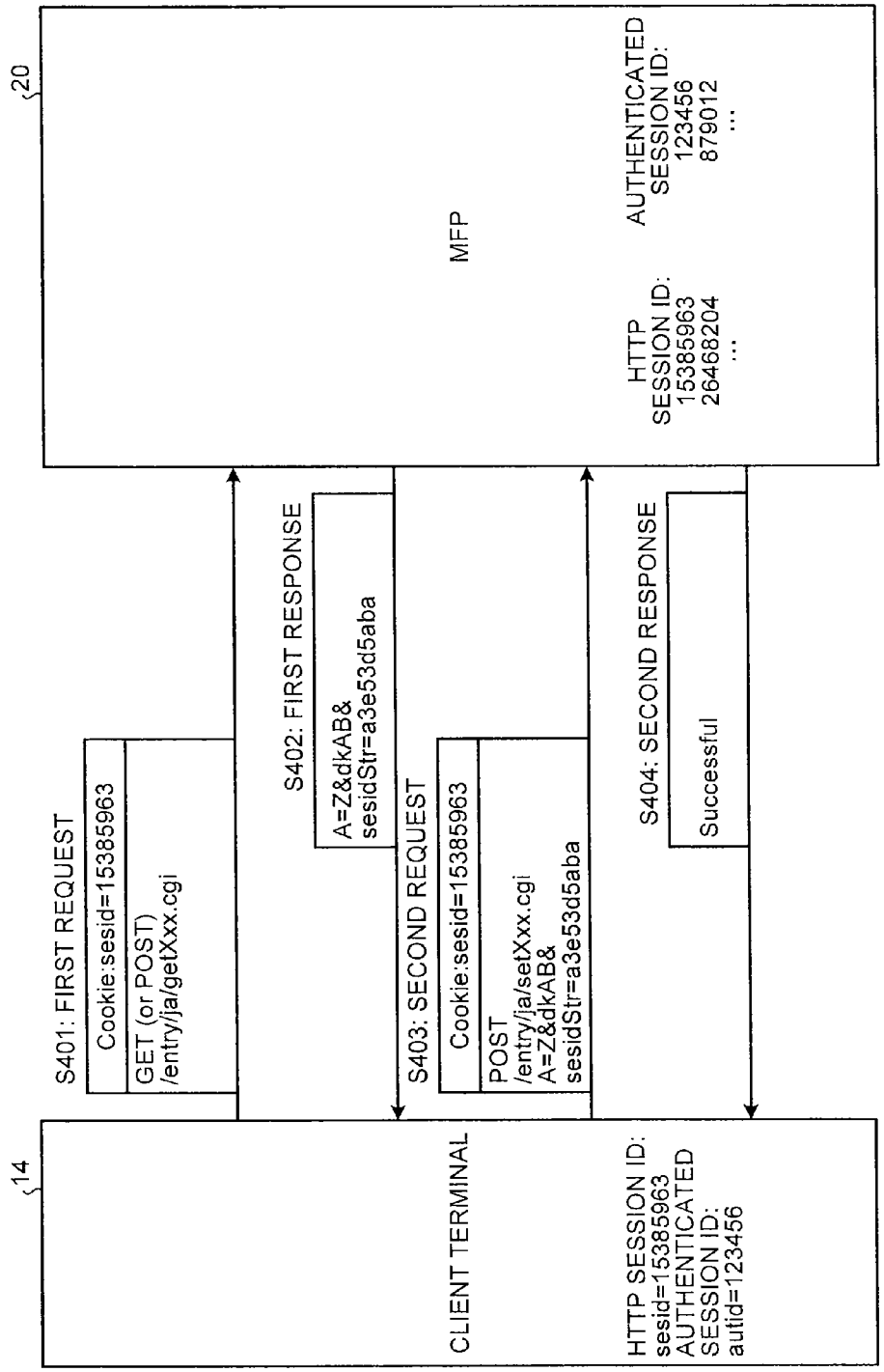
FIG. 11 is a schematic for explaining an example of an operation performed when a setting is legitimately requested by an administrative user.
Figure 12:
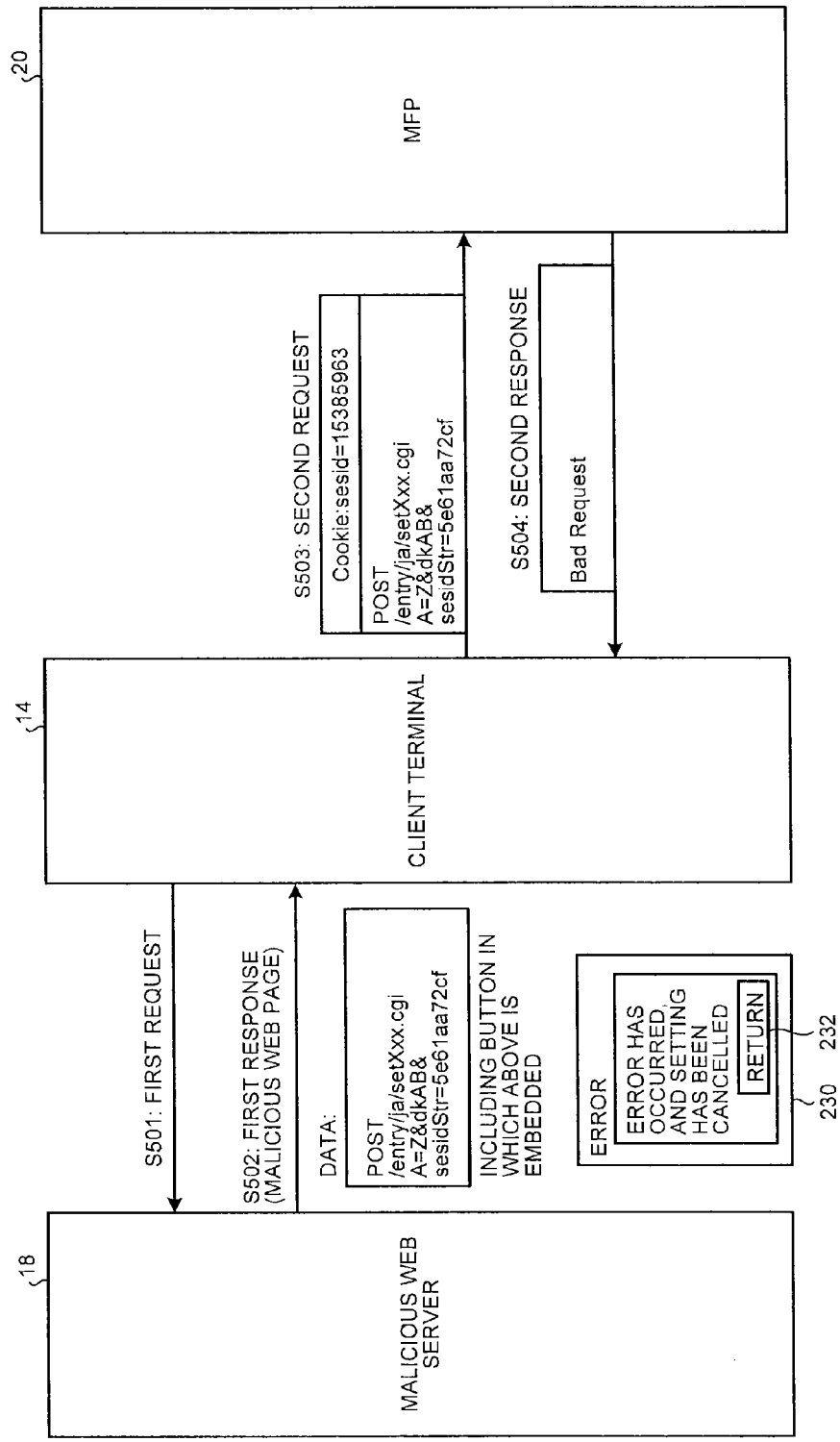
FIG. 12 is a schematic for explaining an example of an operation performed when a CSRF attack is received.

FIG. 11 is a schematic for explaining an example of an operation performed when a setting is legitimately requested by an administrative user. By contrast, FIG. 12 is a schematic for explaining an example of an operation performed when a setting is requested illegitimately (when a CSRF attack is received). In both of the examples illustrated in FIGS. 11 and 12, it is assumed that the client terminal 14 has logged in on the system setting web application 110 of the MFP 20 as a legitimate administrative user. In other words, it is assumed that both of the HTTP session ID and the authenticated session ID are shared between the web browser 150 and the MFP 20.

The operation performed when a legitimate setting is requested will now be explained with reference to FIG. 11. When a legitimate setting is requested, to begin with, at Step S401, the client terminal 14 transmits a GET request specifying a predetermined URL and in which an HTTP session ID (sesid=15385963) is included as a cookie to the MFP 20, as a the first request. In this example, a GET request is used, but a POST request may be used instead. In response to the request, the MFP 20 generates an authentication token (sesidSTR=a3e53d5aba) using the token generating unit 140, and sets expiration time as appropriate. At Step S402, the MFP 20 embeds the authentication token in the setting form screen, and returns the first response.

Upon receiving the first response, the client terminal 14 displays the setting form screen. At Step S403, the client terminal 14 transmits a POST request specifying a predetermined URL, appended with a setting specified on the setting form screen and the authentication token included in the first response to the MFP 20, as the second request. In response to the second request, the MFP 20 validates the authentication token (sesidSTR=a3e53d5aba) using the token validating unit 142. In this example, because the HTTP session ID matches, and the embedded authentication token and the recalculated validating token match as well, validity of the request is confirmed. Therefore, the registration process of the setting is executed. At Step S404, the MFP 20 returns a response indicating that the setting change has been completed successfully as a second response.

An example of an operation when a setting is requested illegitimately, in other words, when a CSRF attack is received, will now be explained with reference to FIG. 12. A CSRF is a vulnerability in which, when a web browser accesses a malicious page, a JavaScript (registered trademark) or the like is executed, the browser is caused to post a malicious parameter on a web user interface of the MFP, and such an access is accepted as a legitimate HTTP session.

As an example of an example in which a setting is requested illegitimately, it is assumed that the client terminal 14 is caused to transmit a request to a malicious web server 18 at Step S501, and to receive a response including a malicious web page at Step S502. The malicious web page specifies the URL of the system setting web application 110 for the MFP 20, and contains a malicious code causing the browser to post a malicious parameter. Embedded in an exemplary malicious web page 230 illustrated FIG. 12 is a code causing a browser to post malicious parameters to the MFP 20 when a RETURN button 232 is clicked. Some kind of token might be embedded in the code as well.

At Step S503, as a result of executing the malicious code, the client terminal 14 is caused to transmit a POST request along with a malicious setting to the MFP 20 as a second request. The malicious web page opens on the web browser 150 on the client terminal 14, and the POST request is issued by the web browser 150 on the client terminal 14. Therefore, the request itself is accepted as an HTTP session from the client terminal 14.

In response to the second request, the MFP 20 validates the authentication token using the token validating unit 142. Despite the HTTP session ID matches, the token value appended to the request and the validating token calculated using the authenticated session ID or the like do not match. Therefore, the validity of the request is negated, and the setting is cancelled. At Step S504, the MFP 20 returns a reply indicating that the setting change has failed as a response.

FIG. 13 is a schematic for explaining how a memory efficiency is improved by the token processing according to the embodiment. In the token processing in conventional technologies, the token values for validating a request need to be retained on the memory, as well as the HTTP session ID and the authenticated session ID. By contrast, in the token processing according to the embodiment, because the validating token value is calculated and compared using the authenticated session ID and the internally managed value as seeds every time a request is received, the token does not need to be managed separately on the memory. Therefore, high memory efficiency can be achieved.

According to the embodiment described above, because a validating token for validating a request is re-calculated using an authenticated session ID of an application, a validating token for each user does not need to be retained on a memory. Therefore, compared with an implementation in which a token is retained separately, the memory efficiency can be improved. Furthermore, because the token is calculated using the internally managed value as well as the authenticated session ID, leakage of an authenticated session ID can also be prevented.

Furthermore, in the embodiment, the method of generating a token can be changed by changing the authenticating information to be used depending on various types of screens, e.g., an application screen displayed before a user logs in, an application screen displayed after a user logs in, and an application screen explicitly defined as a page to be protected. Furthermore, because other authenticating information such as an HTTP session ID or user agent information can be used as an alternative when the authenticated session ID cannot be acquired, a protection against a vulnerability can be ensured for each user, without sacrificing the memory efficiency.

Figure 14:
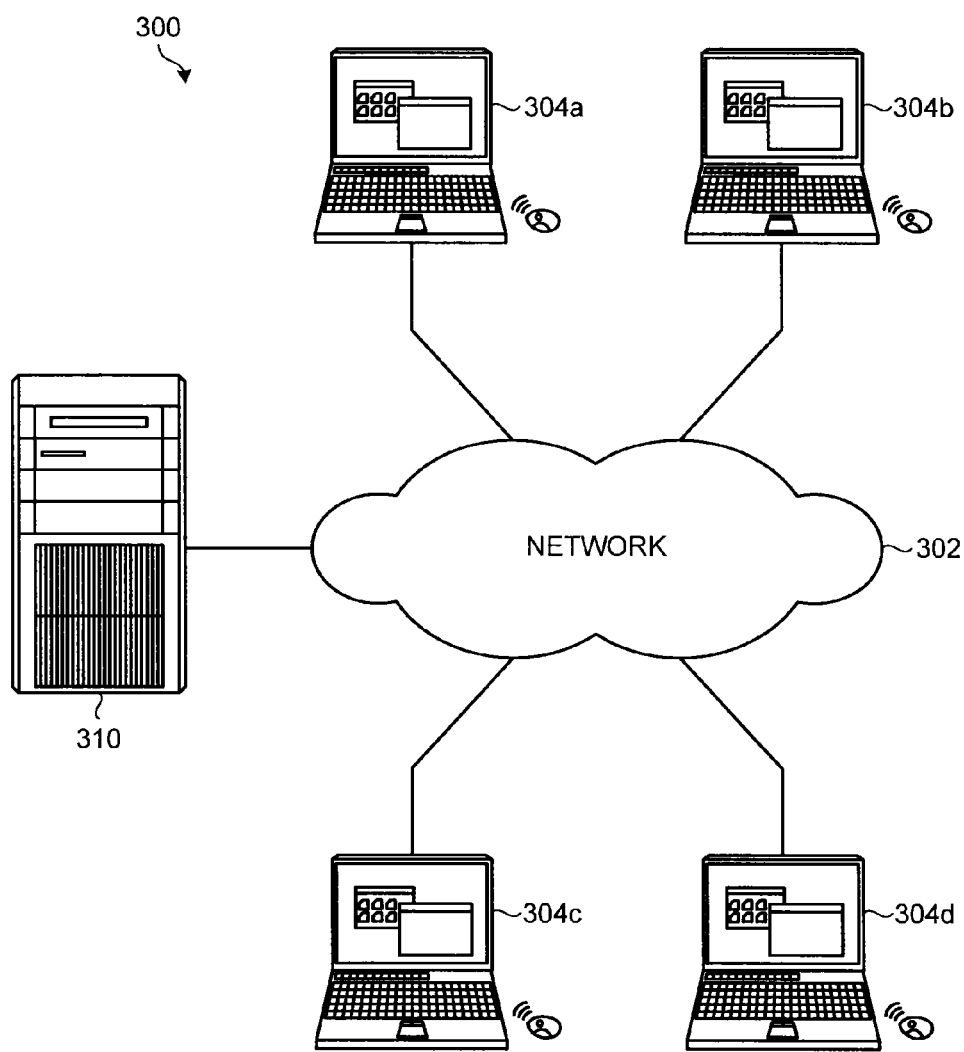
FIG. 14 is a schematic of a configuration of a network environment in which a web server according another embodiment is deployed.

Explained in the embodiment is an example in which the present invention is applied to a system setting web application provided to the MFP 20. However, a configuration to which the token processing may be applied is not limited to a system setting web application provided to an MFP. For example, in another embodiment (another network environment 30), the information processing apparatus may be configured as a web server 310 that provides a web application via a network 302 to a number of client terminals 304a to 304d, such as an on-line shopping application, as illustrated in FIG. 14.

Figure 15:
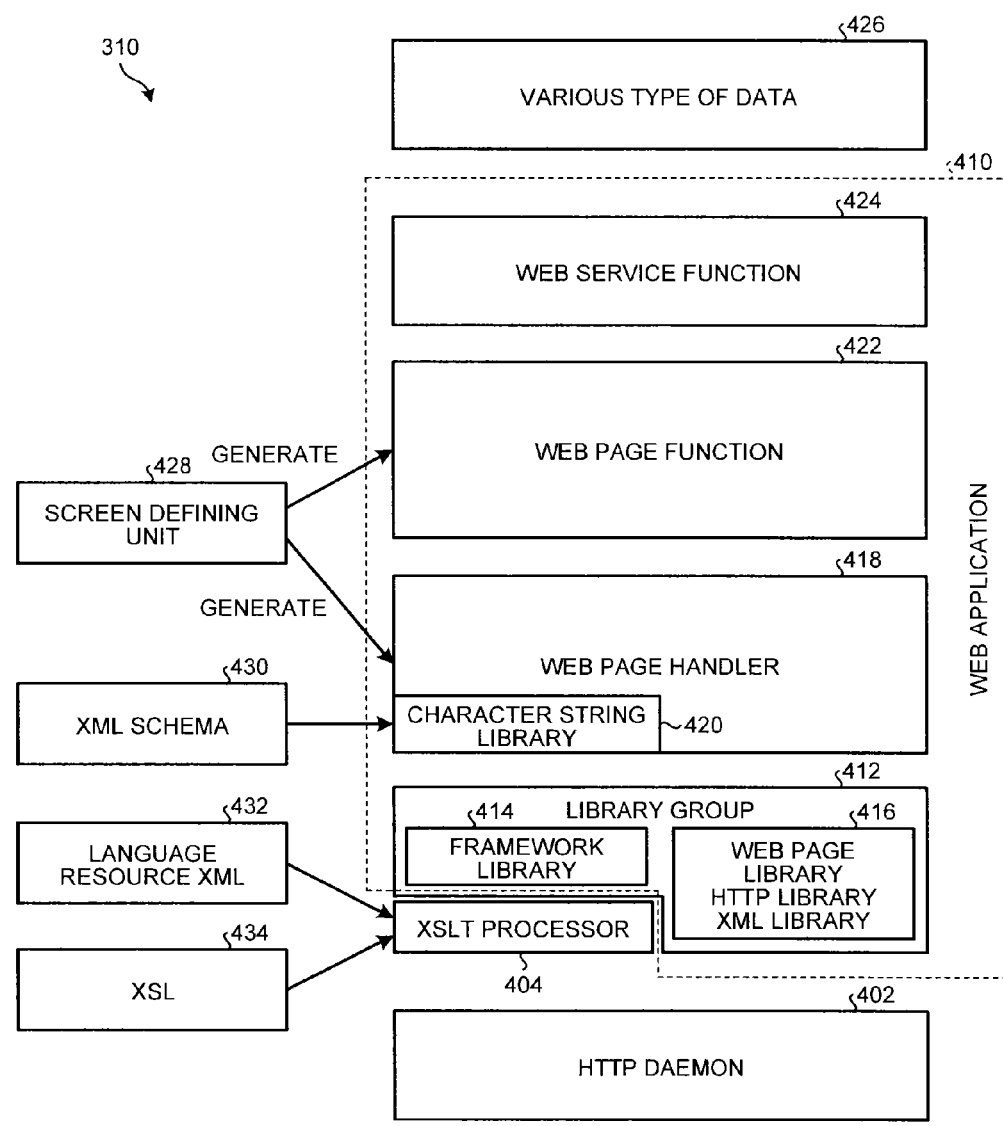
FIG. 15 is a block diagram of a web application realized by a web server according to another embodiment.

FIG. 15 is a block diagram of a web server configured as the web server 310 according to another embodiment. As illustrated in FIG. 15, the web server 310 includes, as a functional configuration, an HTTP daemon 402, a web application 410, a screen defining unit 428, an XML schema 430, a language resource XML 432, and an XSL 434. In this embodiment, the web server 310 includes various types of data 426 provided on the web application, instead of the application/control service 126 illustrated in FIG. 3. Other units such as the token generating unit and the token validating unit can be configured in the same manner as those of the embodiment using the MFP 20.

As explained above, according to the embodiments described above, the present invention can provide an information processing apparatus, an information processing system, and a computer program that can validate a request, without requiring any authentication token for validating the request to be stored for each user and without forcing a user to perform a cumbersome operation of entering authenticating information.

The functional units described above can be realized by a computer-executable program described in a legacy programming language or an object-orientated programming language, such as an assembler language, C, C++, C#, or Java (registered trademark), and may be stored in an apparatus-readable recording medium such as a ROM, an electrically erasable programmable read-only memory (EEPROM), an erasable programmable read-only memory (EPROM), a flash memory, a flexible disk, a compact disk read-only memory (CD-ROM), a compact disk rewritable (CD-RW), a digital versatile disk read only memory (DVD-ROM), a DVD random access memory (RAM), a DVD-RW, a Blu-ray (registered trademark) disk, a secure digital (SD) card, or an magneto-optical (MO) disk, or may be distributed over an telecommunication circuit.

According to the configurations described above, because a token value calculated using authentication identification information of a user having authenticated is used as an authentication token, vulnerability measures can be provided at a high memory efficiency, without requiring any authentication token to be managed on a memory in a web application. Because the user is not required to enter any authenticating information or the like, the user does not have to operate any cumbersome operations.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus connected to a network, the image processing apparatus comprising:
   circuitry configured to
      authenticate an information processing apparatus connected via the network,
      store authentication identification information that identifies the information processing apparatus authenticated,
      receive a first request from the information processing apparatus that requests a setting screen of the image processing apparatus,
      generate, in response to acquiring the authentication identification information corresponding to the information processing apparatus, a token value based on the authentication identification information corresponding to the information processing apparatus and an internally managed value managed in the image processing apparatus, when the image processing apparatus receives the first request from the information processing apparatus,
      create, as a first response responding to the first request, screen information which includes the token value and which is for implementing one or more settings of the image processing apparatus and to be transmitted to the information processing apparatus, and information instructing the information processing apparatus to include the token value in a second request corresponding to the first response,
      transmit to the information processing apparatus, as the first response, the screen information created,
      receive the second request including the token value and a request to register the one or more settings, and
      generate, in response to receiving the second request, a token value based on the authentication identification information corresponding to the information processing apparatus which transmits the second request and the internally managed value, and determine whether or not the generated token value is coincident with the token value included in the second request.

2. The image processing apparatus according to claim 1, wherein, when the circuitry acquires no authentication identification information, the circuitry is further configured to attempt to acquire a first seed for a token calculation in steps from available identification information, and calculate the token value using the first seed and the managed value as a second seed.

3. The image processing apparatus according to claim 1, wherein, when the circuitry acquires no authentication identification information, the circuitry is further configured to acquire authentication identification information of a transaction, and calculate the token value using the authentication identification information of the transaction as a first seed, instead of the authentication identification information, and using the managed value as a second seed.

4. The image processing apparatus according to claim 3, wherein, when the circuitry acquires no authentication identification information of the transaction or no authentication identification information, the circuitry is further configured to acquire user agent information, and calculate the token value using the user agent information as a first seed.

5. The image processing apparatus according to claim 4, wherein the user agent information includes information of a browser or an operating system (OS) associated with the information processing apparatus.

6. The image processing apparatus according to claim 1, wherein the first response includes data instructing a client receiving the first response to include the token value in the second request and then transmit the second request.

7. The image processing apparatus according to claim 1, wherein
the circuitry manages an HTTP transaction including an HTTP request and an HTTP response,
the authentication identification information that is stored by the circuitry corresponds to a user authenticated to be logged in on a web application, and
the token value is calculated using a hash function.

8. An image processing system comprising:
a client; and
a server, the server and the client being connected via a network, wherein the server includes
server circuitry configured to
authenticate the client connected via the network,
store authentication identification information that identifies the client authenticated,
receive a first request from the client that requests a setting screen of the server,
generate, in response to acquiring the authentication identification information corresponding to the client, a token value based on the authentication identification information corresponding to the client and an internally managed value managed in the server, when the server receives the first request from the client,
create, as a first response responding to the first request, screen information which includes the token value and which is for implementing one or more settings of the server and to be transmitted to the client, and information instructing the information processing apparatus to include the token value in a second request corresponding to the first response,
transmit to the client, as the first response, the screen information created,
receive the second request including the token value and a request to register the one or more settings, and
generate, in response to receiving the second request, a token value based on the authentication identification information corresponding to the client which transmits the second request and the internally managed value, and determine whether or not the generated token value is coincident with the token value included in the second request, and
the client includes client circuitry configured to receive the first response from the server and transmit the second request appended with the token value to the server.

9. The image processing system according to claim 8, wherein, when the server circuitry acquires no authentication identification information, the server circuitry is further configured to attempt to acquire a first seed for a token calculation in steps from available identification information, and calculate the token value using the first seed and the managed value as a second seed.

10. The image processing system according to claim 8, wherein, when the server circuitry acquires no authentication identification information, the server circuitry is further configured to acquire authentication identification information of a transaction, and calculate the token value using the authentication identification information of the transaction as a first seed, instead of the authentication identification information, and using the managed value as a second seed.

11. The image processing system according to claim 10, wherein, when the server circuitry acquires no authentication identification information of the transaction or no authentication identification information, the server circuitry is further configured to acquire user agent information, and calculate the token value using the user agent information as a first seed.

12. The image processing system according to claim 8, wherein the first response includes data instructing a client receiving the first response to include the token value in the second request and then transmit the second request.

13. The image processing system according to claim 8, wherein
the server circuitry manages an HTTP transaction including an HTTP request and an HTTP response,
the authentication identification information that is stored by the server circuitry corresponds to a user authenticated to be logged in on a web application, and
the token value is calculated using a hash function.

14. A non-transitory computer-readable storage medium including computer executable instructions, wherein the instructions, when executed by a computer cause the computer to function as an image processing apparatus connected to a network and to perform a method, the method comprising:
authenticating an information processing apparatus connected via the network;
storing authentication identification information that identifies the information processing apparatus authenticated;
receiving a first request from the information processing apparatus that requests a setting screen of the image processing apparatus;
generating a token value based on the authentication identification information corresponding to the information processing apparatus and an internally managed value managed in the image processing apparatus, when the image processing apparatus receives the first request from the information processing apparatus;
creating, as a first response responding to the first request, screen information which includes the token value and which is for implementing one or more settings of the image processing apparatus and to be transmitted to the information processing apparatus, and information instructing the information processing apparatus to include the token value in a second request corresponding to the first response;
transmitting to the information processing apparatus, as the first response, the screen information created;
receiving the second request including the token value and a request to register the one or more settings; and
generating, in response to receiving the second request, a token value based on the authentication identification information corresponding to the information processing apparatus which transmits the second request and the internally managed value, and determining whether or not the generated token value is coincident with the token value included in the second request.

* * * * *